United States Patent [19]
Mattone et al.

[11] 3,904,609
[45] Sept. 9, 1975

[54] METHOD FOR THE PREPARATION OF PURE LACTAM FROM ITS PRIMARY SOLUTIONS IN AN ORGANIC SOLVENT

[75] Inventors: Roberto Mattone, Seveso; Giancarlo Sioli, Como; Luigi Giuffre, Milan, all of Italy

[73] Assignee: Snia Viscosa Societa Nazionale Industria Applicazioni Viscosa S.p.A., Milan, Italy

[22] Filed: July 18, 1973

[21] Appl. No.: 380,332

[30] Foreign Application Priority Data
June 28, 1972 Italy.................................. 26385/72

[52] U.S. Cl............................................ 260/239.3 A
[51] Int. Cl.² ...................................... C07D 201/16
[58] Field of Search ............................. 260/239.3 A

[56] References Cited
UNITED STATES PATENTS
2,737,511  3/1956   Cohn ........................... 260/239.3 A
3,145,198  8/1964   Morbidelli et al. ........... 260/239.3 A FOREIGN PATENTS OR APPLICATIONS
1,021,709  3/1966   United Kingdom.......... 260/239.3 A OTHER PUBLICATIONS
Weissberger, "Techniques of Organic Chemistry," 2nd Ed., Part I, Separation and Purification (Interscience), (1956), pp. 470–479.

Primary Examiner—Norma S. Milestone
Assistant Examiner—Robert T. Bond
Attorney, Agent, or Firm—Shlesinger, Fitzsimmons & Shlesinger

[57] ABSTRACT

A method for the preparation of pure lactam is disclosed wherein a primary solution of the lactam in an organic phenolic solvent is supplemented by a compound miscible with the solution which is compatible with the primary solvent and is a solvent for the primary solvent but not for the lactam and susceptible of giving rise to precipitation of the lactam, the lactam being then separated from the mixture of the primary solvent and the compound which is a solvent for said primary solvent.

8 Claims, 1 Drawing Figure

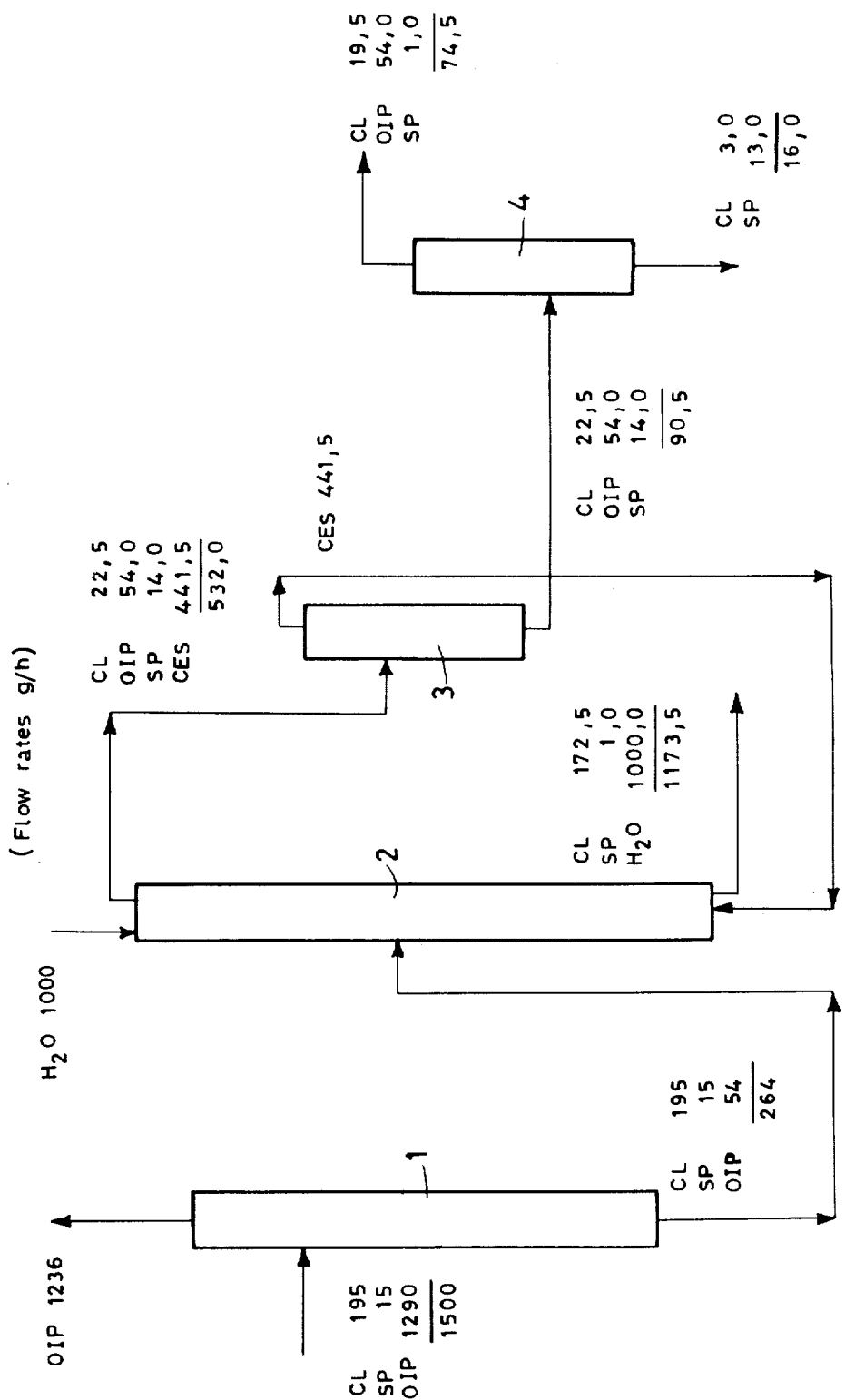

METHOD FOR THE PREPARATION OF PURE LACTAM FROM ITS PRIMARY SOLUTIONS IN AN ORGANIC SOLVENT

This invention relates to a method for the preparation of lactams in the pure state and more particularly omega lactams among which caprolactam is by far the most interesting. The invention will be disclosed and described hereinafter with specific reference to the preparation of high purity caprolactam but it should not be construed as being limited to this particular field of application.

It is known that lactams are commonly produced by methods which are conducive to acidic reaction mixtures, often due to sulfuric acid. Caprolactam, in point of fact, is obtained under this form when it comes from the Beckmann rearrangement of cyclohexanoneoxime or when it has been obtained by nitrosation of cycloaliphatic compounds, such as described for example in Italian Patents No. 603,606 and No. 608,873 and in the U.S. Patent application No. 325,563 filed on Jan. 22, 1973, all by the same Applicants hereof.

According to the most commonly adopted methods, the extraction of the lactam from the acidic reaction mixture comprises the neutralization of the sulfuric acid, for example with ammonia, soda or another base. These methods lead to the production of great amounts of by-products having a very low commercial value (the sulfates as obtained by neutralization) and to the impossibility of recovering considerable amounts of the acid as used in the lactam synthesis process.

More advantageous procedures, as described in the patent literature and more particularly in the British Patent No. 1,021,709, provide for the extraction of caprolactam from acidic solutions which contain the same, by an organic acidic solvent, more particularly phenol. The serious limitations, which have virtually been a bar heretofore against the use of such a method according to a technical approach which essentially consists in the extraction of the lactams from the acidic mixture containing them, by using as the extractant organic compounds belonging to a particular class of phenols, which are substituted by at least one alkyl substituent with at least three carbon atoms and fulfilling certain requirements. Among these solvents there have been indicated for example ortho-isopropylphenol and orthosec.butylphenol. By employing such extractants, the lactam can quantitatively be extracted from the acidic reaction mixtures and transferred in a virtually total manner into a phenolic organic solution which can be properly called a "primary extraction solution" from which the sulfuric acid has been removed in a quantitative manner by washing with water and which solution contains an addition compound between the lactam, more particularly caprolactam, and the organic solvent.

To recover the lactam from solution of this kind, the cited literature suggests distillation procedures by which the extractant is removed. This procedure should be considered, in the light of the current technical knowledge, as a rather expensive method.

It has been ascertained by the applicant, on the other hand, that the distillation method does not afford desirable results. As a matter of fact, in the hypothesis of using an extractant having a boiling point not very distant from that of the lactam, the evaporation of the solvent to recover the solute would unavoidably lead to losses of the latter and it would not be possible to achieve a complete separation of the solvent from the solute. Even when using solvents which have a boiling point which is considerably different from that of the lactam, irrespective of the drawbacks inherent in the integral separation methods by distillation, it has been seen that it is extremely difficult totally to isolate the solute.

These drawbacks have been experienced even when using the advantageous organic solvents. It has been ascertained, in fact, that from a primary solution, for example in isopropylphenol, after an initial evaporation of the latter at the boiling point thereof, as nearly equimolecular quantities of caprolactam and isopropylphenol are attained, there is an abrupt temperature rise whereafter a further simultaneous evaporation is experienced of both the solvent and the solute, at a virtually constant temperature.

In addition the lactam as thus obtained by distillation has not a negligible impurity content. The excess solvent which can be removed by distillation, in fact, does not entrain with it considerable amounts of impurities which become concentrated to pollute the product, more particularly the caprolactam, which is thus inapt to be commercially used unless subsequent expensive and wearisome purification processes are adopted.

In the light of the foregoing, it is the subject matter of the present invention a method for extracting lactams, more particularly but not exclusively caprolactam from primary solutions in a phenolic organic solvent, by which method it becomes possible to obtain quantitatively lactam, more particularly caprolactam, in a state of high purity, irrespective of the difference between the boiling point temperatures of the phenolic solvent and the lactam, respectively.

In its essence, the method according to the present invention comprises the addition, to the primary solution of lactam in a phenol, as obtained by extraction from an acidic solution, generally a reaction mixture and possibly otherwise, of a compound which can be admixed with said solution and is compatible with the primary solvent, and such as to bring about precipitation phenomena of the lactam. On considering that such a precipitation is otherwise an equilibrium reaction, the method is completed by subsequent stages of addition of said compound and separation of the precipitated lactam until virtually all of the lactam contained in the primary solution has been exhausted.

According to a first embodiment of the invention, these sequential separations are carried out in the solid state, more particularly by filtration. In such a case it is provided subsequently to add to the primary solution small amounts of said compound which can be admixed and is compatible with the primary solvent and by carrying out corresponding subsequent filtrations of the lactam values which have been so precipitated until substantially all the lactam contained in the primary solution has been exhausted.

According to a preferred embodiment of the invention, the method replaces the lactam precipitation stage in the solid state by adding to the primary solution both said compound which can be mixed with and is compatible with the primary solvent and another compound which is a solvent of the lactam but is not, however, compatible with the primary solvent since it is not dissolved therein. This second compound could be properly defined as a "secondary solvent" on account of its characteristic task in the method according to this invention.

More specifically disclosing said preferred embodiment, in the particular field of the production of pure caprolactam, by qualitative and quantitative extraction thereof from a primary phenolic solution as obtained from a primary solution, for example in isopropylphenol, the separation of caprolactam can be carried out as a single step process by adding to the primary solution a mixture of two compounds, one of which, by acting as a secondary solvent, is a solvent for caprolactam (and of the lactam in general) but is not a solvent for isopropylphenol (and of phenols in general), whereas the other compound is a solvent for the latter but not for caprolactam.

Among the compounds which are solvents for the phenols and more particularly for the substituted phenols, but not for the lactams, more particularly caprolactam, there are typically included cyclohexane, as well as toluene, benzene, paraffine and aromatic hydrocarbons, chlorinated hydrocarbons.

Water can be employed with advantage as the secondary solvent.

By operating according to said preferred embodiment of the invention, the removal of the lactam is achieved in the form of a secondary solution in its solvent, wherefrom the lactam can easily be recovered with any optional known method, whereas a mixture of the primary solvent and the solvent therefor is left, a mixture which, in turn, can be split into its components by any conventional method.

According to a particularly preferred embodiment of the invention, these operations are carried out as a continuous run, in an apparatus for the liquid-liquid extraction, or otherwise.

When the lactam to be produced is present in a primary organic solution in which the primary solvent has a boiling point temperature which is adequately distant from that of the lactam-solvent compound, the stages which had been enumerated above can advantageously be preceeded by a partial distillation, which is intended to enrich the primary solution of the lactam, a portion of the primary solvent being withdrawn.

The lactam thus obtained has a high purity since it has been ascertained, according to an advantageous feature of the invention, that the impurities remain to a prevailing degree in the primary solvent.

The foregoing and other features and advantages of the invention, along with the showing of its practicability and industrial applicability will become apparent in the course of the ensuing disclosure of a few nonlimiting examples thereof, one of which is described with reference to the accompanying drawing.

EXAMPLE 1

This example considers the extraction of pure caprolactam from a solution in isopropylphenol, as a result of a previous extraction procedure carried out on 100 grams of an acidic lactam mass coming from the Beckmann rearrangement of cyclohexanone oxime in a sulfuric acid medium, and containing 45 percent by weight of epsilon caprolactam. Obviously, the present Example, and also the others which follow, are applied to the preparation of pure lactam from phenolic solution irrespective of the way in which the latter are obtained, provided that they be compatible with the adopted procedure.

The solution of caprolactam in a phenol, as obtained as suggested above, has been subjected to distillation in a 500-ml flask on top of which a short Vigreux column had been mounted; the heat was supplied by an infrared ray heater. By operating under an abs. pressure of 3 millimeters of mercury, there were distilled, at the constant temperature of 73°C, 225 grams of orthoisopropylphenol, which, when analyzed, exhibited the same characteristics of the one used for the extraction and thus was immediately reusable.

As soon as the temperature began to rise (thus detecting the virtually total withdrawal of orthoisopropylphenol which did not react with caprolactam) the distillation was discontinued, and the mass which was left in the flask was allowed to cool.

Such a mass was then admixed, in a 500-ml separatory funnel, with 100 mls water and 100 mls cyclohexane. Decantation was allowed to take place so as to obtain two superposed phases: the bottom layer was poured in a second separatory funnel and extracted four times, each time with 50 mls cyclohexane. The supernatant layer which was left in the first separatory funnel, was extracted, in turn, four times with 50 mls water each time.

All of the thus obtained aqueous phases were combined, and the cyclohexane phases too.

From the combined cyclohexane phases, cyclohexane was distilled off, a residue of 31.5 grams being obtained, which consisted of 25 grams orthoisopropylphenol, 5 grams caprolactam and 1.5 grams by-products.

From the combined aqueous phases water was removed by distillation and a residue of 40.2 grams was obtained, which comprised 39.7 grams of caprolactam and 0.5 grams of by-products.

EXAMPLE 2

The procedure was applied to a solution of caprolactam in ortho-secondary butylphenol, as obtained by extracting caprolactam from a 100 gram mass of the same nature and composition as shown in Example 1, by using 250 grams as a total of said phenol.

The solution of caprolactam in ortho-secondary butylphenol was initially subjected to distillation, under a pressure of 3 millimeters of mercury and, as described hereinbefore until removing 225 grams of the phenol. The mass which was left in the flask was allowed to cool and taken up with 200 mls n-hexane. Caprolactam was separated in the form of white crystals which were collected on a filter having a porous glass diaphragm. The caprolactam crystals were washed three times on the filter and always with n-hexane and then dried at 50°C under vacuum.

Thus there were recovered 40 grams of caprolactam, containing negligible amounts of impurities.

The caprolactam, the ortho-sec.butyl phenol and the by-product which were lacking in the quantitative balance were integrally recovered by evaporating all the n-hexane from the combined filtrates.

EXAMPLE 3

A solution in phenol of caprolactam was used, in ortho-isopropylphenol, having no $H_2SO_4$ and obtained from an acidic lactam mass coming from the nitrosation of hexahydrobenzoic acid with a sulfuric solution of $NOHSO_4$.

The phenolic solution was subjected to distillation in a fractionation column of the Oldershaw type, consisting of a 1,000 ml reboiler heated by infrared rays and comprising a section of a column having an inside diameter of 25 mms, with 10 foraminous plates having a vacuum jacket and a silver coating, a magnetic reflux device governed by a timer and a vapour condensation apparatus.

By such an apparatus, maintained at an internal pressure of 3 millimeters of mercury and adjusted so as to obtain a reflux ratio of 5 to 1, the passage of the head of ortho-isopropylphenol vapours was experienced at the temperature of 73°C. The distillation was stopped as soon as the head temperature began to rise, and, at that instant 467 grams of isopropylphenol were condensed; having the same purity as that of the one used for the preceding extraction of caprolactam from the acidic lactam mass coming from nitrosation, and thus totally and immediately reusable.

The product left in the 1,000 ml flask was transferred into a 200-ml flask and, in turn, was connected to the same distillation apparatus. Once heating has been resumed, the apparatus was brought to an internal pressure of 1.2 millimeters of mercury and adjusted to have a reflux ratio of 3 to 1.

There was obtained in the head products, in the temperature range from 97°C to 98.5°C, a flow of vapours which were condensed in a graduated collecting vessel, and distillation was continued until the volume of the condensate attained 100 mls. The distillate of the weight of 100.5 grams had the appearance of a clear, colourless liquid, with a tendency to crystallize with the lapse of time. When, analyzed, it was formed by 69.7 percent by weight of caprolactam and 30.3 percent of ortho-isopropylphenol, the impurities being such as not to be capable of being measured.

The distillate was poured in a separatory funnel of the capacity of 500 mls and shaken together with 150 mls water and 150 grams cyclohexane. By operating virtually under the same conditions as described in the preceding Example, the product was allowed to decant with the formation of two phases, the bottom phase being poured in a second separatory funnel and extracted four times with 100 mls of cyclohexane each time, whereas the supernatant phase, which was left in the first separatory funnel, was extracted four times with 100 mls each time of water. All the aqueous phases were combined and all the cyclohexane phases as well. By distillation, cyclohexane was removed from all the cyclohexane phases and a residue was obtained, which consisted of 30.5 grams ortho-isopropylphenol and 7.5 grams caprolactam. From the aqueous phases water was removed by distillation, a residue being obtained which consisted of 62.5 grams of crystalline caprolactam, having a white colour and a high purity.

The residue (13.0 grams) of the second distillation was distilled in turn, in a microdistillation apparatus, obtaining by distillation 5.5 grams of a product consisting of 4.0 grams of caprolactam, 1.0 grams of ortho-isopropylphenol and 0.5 grams of by-products, whereas the residue (7.5 grams) of the microdistillation consisted of 7.0 grams of by-products and 0.5 grams of caprolactam. The total removal of the by-products is thus apparent, with quite a negligible dispersal of caprolactam.

Summing up, the high purity caprolactam, as obtained in the different stage of the treatment, corresponds to 98.6 percent of the initially charged quantity, whereas the recovered ortho-isopropylphenol, under condition of immediate capability of reuse, was 99.7 percent of the initially charged amount.

EXAMPLE 4

This example discloses a procedure for the continuous performance of the method of the invention, by using an apparatus comprising the component parts (individually installed according to the technical knowledge in the field) which are associated and connected as diagrammatically shown in the accompanying drawing. To complete the ensuing description, along-side each component part of the implementation and a few connections between them, and also the outlet ducts, there are shown the rates of flow of the different compounds which are present and are treated in the apparatus, expressed in terms of grams per hour. The different compounds are identified by the following symbols, which, in turn, are used in the descriptions of the Examples, to facilitate the comparison between the disclosure and the graphical showing thereof:

| | |
|---|---|
| CES | cyclohexane |
| CL | epsilon caprolactam |
| $H_2O$ | water |
| OIP | ortho-isopropylphenol |
| SP | by-product |

Obviously, the apparatus has the necessary feeding and transfer means at the desired rates of flow for the different compounds, and the thermal control means and anyhow of all that which is provided for by the appertaining art for operations of this kind.

1500 grams of a solution coming from the extraction of epsilon caprolactam (CL) from an acidic reaction mass with ortho-isopropylphenol (OIP) formed by 195 grams CL, 1290 grams OIP and 15 grams of by-products (SP), mainly of the high-boiling kind, are fed every hour continuously to a distillation column 1 having 10 foraminous plates of the Oldershaw type having a diameter of 50 millimeters.

At the head there are withdrawn 1236 grams an hour of pure OIP which is recycled to the CL extraction installation. The tails are totally sent to the centre of a liquid-liquid extraction column having rotary discs 2 to which there are fed from the top 1000 grams an hour of water and, from the bottom 441.5 grams an hour of cyclohexane (CES).

At the head there are separated 532 grams an hour of a product consisting of : 22.5 grams CL, 54.0 grams OIP, 14.0 grams SP and 441.5 grams CES. At the tail there were obtained, each hour, 172.5 grams of CL, 1.0 grams of SP and 1,000 grams of $H_2O$ which will be purified as indicated hereinafter.

The head product is sent to a stripper 3 consisting of a conventional reboiler for distillation columns, on the top of which there is only a drop separator: here all the CES is separated by distillation (441.5 grams) which is returned to the column 2 whereas the discharge product is sent to a stripper similar to the preceding one (4) but at a higher boiler temperature, from which there are recovered on the head 74.5 grams an hour, consisting of 19.5 grams of CL, 34.0 grams of OIP and 1.0 grams of SP, which can be recycled to the column 1 whereas the discharge, which contains all the residual SP and 3.0 grams of CL can be removed from the process.

The caprolactam aqueous solution as collected at the bottom of the column 2 has been dehydrated by distilling off the water in a vacuo. The residual caprolactam, by simple distillation in which a first fraction equal to 5 percent of the charge and a tail fraction equal to about 10 percent of the total were discarded, gave a product having the following specifications:

| | |
|---|---|
| permanganate number | more than 7200 |
| APHA colour | less than 5 |
| acidity (as CH₃COOH) | 0.0005 milliequivalents per kilogram |
| volatile bases | 0.1 milliequivalent NaOH 0.1 normal per 20 grams of product. |

What is claimed is:

1. A method for the preparation of a pure caprolactam from a diluted acidic solution thereof, comprising first extracting the caprolactam from the said diluted acidic solution thereof with a primary substituted phenol solvent to form a caprolactam-containing primary solution, supplementing said primary solution with a compound compatible with said primary solvent, and selected from the group consisting of cyclohexane, toluene, benzene, and aliphatic, aromatic and chlorinated hydrocarbons, and with a secondary solvent for the caprolactam, which is not compatible with the primary solvent, to promote formation of an extracted caprolactam-containing secondary solution; whereby precipitation phenomena is promoted, and then separating the caprolactam-containing secondary solution from the mixture of the primary solvent and the compound compatible therewith, and removing the caprolactam from said secondary solution.

2. A method as claimed in claim 1, wherein the separation of the caprolactam is carried out in a single step process by adding to said primary solution a mixture of said compound which acts as a secondary solvent but which is incompatible with the primary solvent and the compound which is compatible with and a solvent for the primary solvent but not for caprolactam.

3. A method according to claim 1, wherein the primary solvent is a phenol substituted by at least an aliphatic substituent having at least three carbon atoms.

4. A method according to claim 1, wherein the secondary solvent for the lactam is water.

5. A method according to claim 1, wherein the addition to the primary solution of the secondary solvent for the lactam and the solvent for the primary solvent are carried out simultaneously in a liquid-liquid extraction apparatus from which there are obtained the secondary solution of the lactam and a mixture of the primary solvent and of the solvent for the latter.

6. A method according to claim 1, wherein the operations described therein are preceded by a concentration of the primary solution by evaporation.

7. A method according to claim 1, wherein the primary solution of caprolactam is obtained by extraction of the primary solvent for caprolactam from acidic reaction mixtures as obtained by Beckmann rearrangement of cyclohexanoneoxime and by nitrosation in an acidic medium of cycloaliphatic compounds.

8. A method according to claim 3, wherein the lactam in the form of a dilute acidic solution is first extracted with said substituted phenol solvent, and after extraction the mixture is distilled to remove a part of the alkylated phenolic solvent, and then the impure caprolactam residue is mixed with cyclohexane and water, and the aqueous layer is then successively extracted with cyclohexane and the cyclohexane layer is successively extracted with water, then the cyclohexane is distilled off from the combined cyclohexane phases and the water is distilled off from the combined aqueous phases to obtain caprolactam.

* * * * *

UNITED STATES PATENT OFFICE
CERTIFICATE OF CORRECTION

Patent No. 3,904,609                    Dated   September 9, 1975

Inventor(s)  Roberto Mattone, Giancarlo Sioli, Luigi Giuffre

It is certified that error appears in the above-identified patent and that said Letters Patent are hereby corrected as shown below:

Cancel all reference to Priority Data as set forth in lines 11 and 12 in column 1 on the title page of the patent.

Signed and Sealed this second Day of March 1976

[SEAL]

Attest:

RUTH C. MASON
*Attesting Officer*

C. MARSHALL DANN
*Commissioner of Patents and Trademarks*